US010316672B2

(12) United States Patent
Smith et al.

(10) Patent No.: US 10,316,672 B2
(45) Date of Patent: Jun. 11, 2019

(54) AIRFOILS WITH LOW-ANGLE HOLES AND METHODS FOR DRILLING SAME

(71) Applicant: General Electric Company, Schenectady, NY (US)

(72) Inventors: Aaron Ezekiel Smith, Simpsonville, SC (US); John Wesley Harris, Jr., Taylors, SC (US)

(73) Assignee: General Electric Company, Schenectady, NY (US)

( * ) Notice: Subject to any disclaimer, the term of this patent is extended or adjusted under 35 U.S.C. 154(b) by 1598 days.

(21) Appl. No.: 14/038,076

(22) Filed: Sep. 26, 2013

(65) Prior Publication Data

US 2015/0184517 A1   Jul. 2, 2015

(51) Int. Cl.
| F01D 5/00 | (2006.01) |
| F01D 5/18 | (2006.01) |
| B23H 9/14 | (2006.01) |
| B26F 1/26 | (2006.01) |
| F01D 5/14 | (2006.01) |
| B23K 26/382 | (2014.01) |

(52) U.S. Cl.
CPC .............. F01D 5/186 (2013.01); B23H 9/14 (2013.01); B23K 26/389 (2015.10); B26F 1/26 (2013.01); F01D 5/141 (2013.01); F01D 5/187 (2013.01); F05D 2230/10 (2013.01); F05D 2230/12 (2013.01); Y02T 50/676 (2013.01)

(58) Field of Classification Search
CPC .......... F01D 5/186; F01D 5/141; F01D 5/187; B23K 26/389; B23H 9/14; B26F 1/26; Y02T 50/676; F05D 2230/12; F05D 2230/10

See application file for complete search history.

(56) References Cited

U.S. PATENT DOCUMENTS

| 3,700,418 A * | 10/1972 | Mayeda ................. F01D 5/183 216/56 |
| 4,676,719 A | 6/1987 | Auxier et al. |
| 5,313,038 A | 5/1994 | Kildea |

(Continued)

FOREIGN PATENT DOCUMENTS

| GB | 2262314 A | 6/1993 |
| JP | S62-168903 A | 7/1987 |
| JP | 2006144785 A | 6/2006 |

OTHER PUBLICATIONS

Japanese-language Office Action, dated Jul. 3, 2018, for related JP patent application No. JP 2014-192074.

(Continued)

Primary Examiner — Richard Chang
(74) Attorney, Agent, or Firm — Armstrong Teasdale LLP

(57) ABSTRACT

A method for fabricating an airfoil includes forming a diffuser section in an exterior surface of the airfoil. The diffuser section is defined by at least an outer surface and an inner surface that converge at a stop surface. The method also includes positioning a drilling element of a drilling device on the stop surface. The method further includes orienting the drilling element at a first angle relative to the exterior surface. The method also includes forming, using the drilling element, a cooling channel extending through the airfoil from the stop surface to an interior surface, thereby forming the cooling channel at substantially the first angle.

18 Claims, 5 Drawing Sheets

(56) References Cited

U.S. PATENT DOCUMENTS

| | | | |
|---|---|---|---|
| 6,202,304 B1 * | 3/2001 | Shatz | B64C 1/12 |
| | | | 204/192.32 |
| 7,041,933 B2 * | 5/2006 | Forrester | B23H 7/26 |
| | | | 219/69.17 |
| 7,374,401 B2 | 5/2008 | Lee | |
| 8,245,519 B1 | 8/2012 | Liang | |
| 2004/0200807 A1 | 10/2004 | Forrester et al. | |
| 2005/0042074 A1 | 2/2005 | Liang | |
| 2013/0020229 A1 | 1/2013 | Elfizy et al. | |
| 2013/0020291 A1 | 1/2013 | Elfizy et al. | |
| 2013/0020292 A1 | 1/2013 | Elfizy et al. | |
| 2013/0020294 A1 | 1/2013 | Elfizy et al. | |

OTHER PUBLICATIONS

Notification of Reasons for Refusal issued in connection with corresponding JP Application No. 2014-192074 dated Dec. 4, 2018 (English Translation Not Available).

* cited by examiner

AIRFOILS WITH LOW-ANGLE HOLES AND METHODS FOR DRILLING SAME

BACKGROUND

This application relates generally to turbine blade airfoils and, more specifically, to methods of drilling cooling holes in turbine blade airfoils.

At least some known turbine blade airfoils use "film cooling" to cool turbine blades during operation of a gas turbine. Film cooling involves channeling cool air from an interior cavity of the turbine blade through air holes formed in the surface of the blade. Thin streams of cool air flow along an external surface of the airfoil to create a cool air buffer between the surface and the high-temperature gases produced during operation.

Known cooling holes are generally formed as a thin aperture or "channel" that is oriented obliquely relative to the surface of the airfoil, and that extends from an interior cavity to the airfoil surface. The desired properties of cooling holes require precision in machining that prohibits some known methods of machining. One known method of forming cooling holes uses electrical discharge machining, or "EDM" drilling. During EDM drilling, an airfoil surface, the "workpiece electrode" and a tool, i.e., the "tool electrode", are submersed in a dielectric fluid. Current is induced between the tool and the work piece to remove material from the workpiece. The tool is then extended through airfoil surface to create the channel. The EDM process enables material to be removed from the airfoil in a precise and computer-controllable manner.

In some applications, it is desirable to form a low-angle channel, i.e., a channel in which the angle of the channel relative to the surface is small, such as less than 30°. However, forming channels at such a shallow angle may be difficult using conventional drilling methods, which may cause alignment difficulties such as slipping or skipping of the working end of the tool across the surface of the workpiece when starting the machining operation.

BRIEF DESCRIPTION

In one aspect, a method for fabricating an airfoil is provided. The method includes forming a diffuser section in an exterior surface of the airfoil. The diffuser section is defined by at least an outer surface and an inner surface that converge at a stop surface. The method also includes positioning a drilling element of a drilling device on the stop surface. The method further includes orienting the drilling element at a first angle relative to the exterior surface. The method also includes forming, using the drilling element, a cooling channel extending through the airfoil from the stop surface to an interior surface, thereby forming the cooling channel at substantially the first angle.

In another aspect, a method for fabricating an airfoil is provided. The method includes forming a diffuser section in an exterior surface of the airfoil. The diffuser section is defined by at least an outer surface and an inner surface that converge at a stop surface. The method also includes forming a flow entry section in an interior surface of the airfoil. The method further includes positioning a drilling element of a drilling device on the stop surface. The method also includes orienting the drilling element at a first angle relative to the exterior surface. The method further includes forming, using the drilling element, a cooling channel extending through the airfoil from the stop surface to the flow entry section after said forming the flow entry section. The cooling channel is oriented at substantially the first angle relative to the exterior surface that is less than 30°.

In yet another aspect, an airfoil is provided. The airfoil includes a diffuser section formed in an exterior surface of the airfoil. The diffuser section is defined by at least an outer surface and an inner surface that converge at a flow discharge. The airfoil also includes a flow inlet section formed in an interior surface of the airfoil. The flow inlet section includes a flow inlet. The airfoil further includes a cooling channel extending through the airfoil from the diffuser section to the flow inlet section. The cooling channel defines the flow discharge and the flow inlet.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3b is a vertical cross-section of an exemplary low-angle cooling hole created using the diffuser section shown in FIG. 3a.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not. Moreover, approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
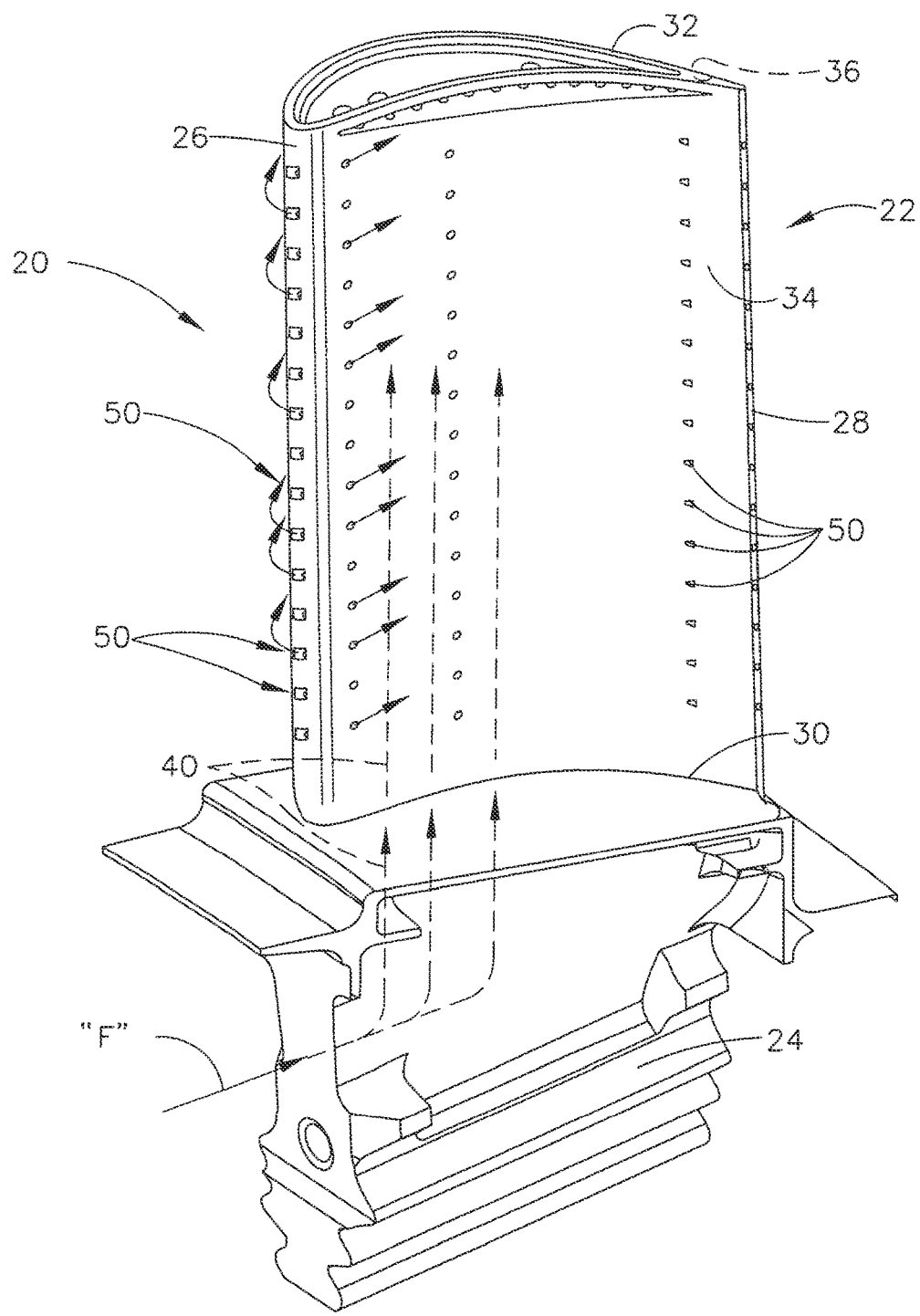
FIG. 1 is a perspective view of a known gas turbine rotor blade that includes cooling holes.

FIG. 1 is a perspective view of a known gas turbine rotor blade 20 that includes cooling holes 50 defined therein. In the exemplary embodiment, blade 20 includes an airfoil 22 having an integral dovetail 24 formed at its radially inner end for use in mounting blade 20 to a rotor disk (not shown) in a conventional manner. In the exemplary embodiment, blade 20 is a first stage high pressure turbine rotor blade that is immediately downstream from a high pressure turbine nozzle (not shown) that receives hot combustion gases from a combustor (not shown) of a gas turbine engine (not shown) in a conventional manner. Airfoil 22 and dovetail 24 are hollow to enable circulation of receiving a cooling fluid "F", such as a portion of compressed air bled from a compressor of the engine therein to facilitate cooling blade 20 during operation.

Airfoil 22, in the exemplary embodiment, includes a leading edge 26 and an opposite trailing edge 28. Airfoil 22 extends from a root 30 defined at a platform portion of dovetail 24 to a tip 32 that is spaced radially-apart outward from root 30. Further, airfoil 22 includes a pressure sidewall 34 that is generally concave and an opposite, suction sidewall 36 that is generally convex and is spaced apart from pressure sidewall 34. Pressure sidewall 34 and suction sidewall 36 extend from leading edge 26 to trailing edge 28, and from root 30 to tip 32.

Moreover, in the exemplary embodiment, airfoil 22 and dovetail 24 include a cooling circuit 40 defined between airfoil sides 34 and 36 for channeling cooling fluid "F" through airfoil 22. Cooling circuit 40 may take any conventional form that facilitates cooling airfoil 22. During operation, cooling fluid "F" is channeled from the engine compressor and through suitable apertures defined between dovetail 24 and its respective axial dovetail slot (not shown) defined in the rotor disk. In the exemplary embodiment, a plurality of diffusion cooling holes 50 spaced along suction side 36 of leading edge 26 and along pressure side 34 of trailing edge 28 enable the cooling fluid "F" to be discharged to provide a cooling film of cooling fluid along the surface of suction side 36 of leading edge 26.

Although, in the exemplary embodiment, the specific airfoil 22 is illustrated as being a portion of the turbine rotor blade 20, the invention applies as well to any form of airfoil, including but not limited to those also found in the stationary turbine nozzle (not shown).

Figure 2:
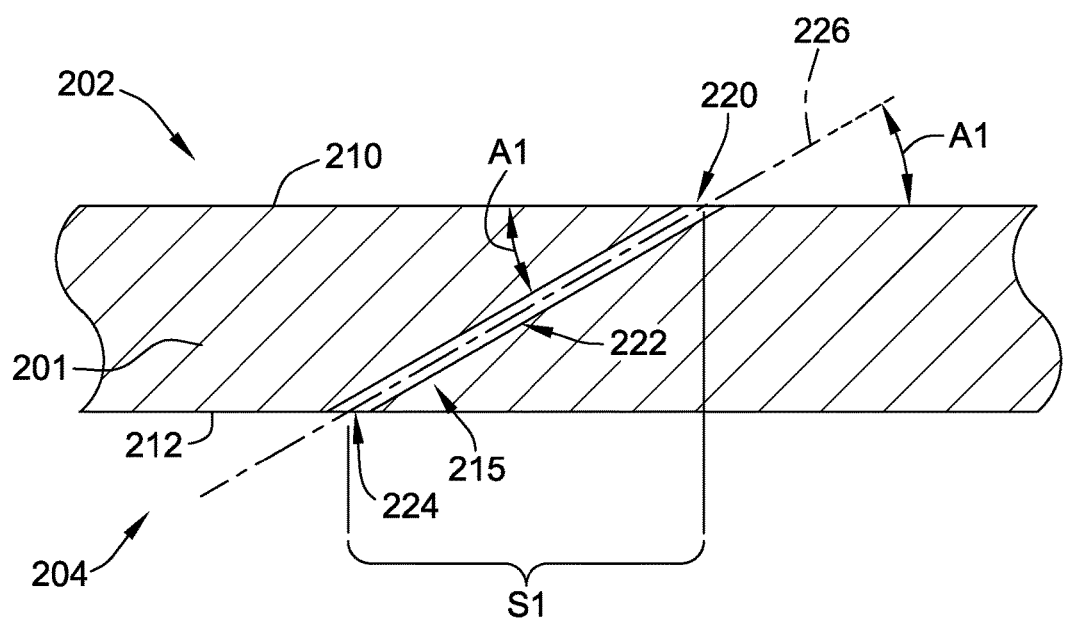
FIG. 2 is a vertical cross-section of a known turbine rotor blade cooling hole.

FIG. 2 is a vertical cross-section of a known cooling hole 215 that may be used with airfoil 22, for example. In the exemplary embodiment, cooling hole 215 is defined in an airfoil sidewall 201 that is fabricated from an electrically-conductive material. Airfoil sidewall 201 may be similar to airfoil sides 34 and 36 (shown in FIG. 1), and in the exemplary embodiment, includes an interior surface 212 and an exterior surface 210. Surfaces 210 and 212 define an interior cavity 204 therebetween. In the example embodiment, airfoil sidewall 201 is exposed to high temperatures created by combustion during operation.

In the exemplary embodiment, cooling hole 215 includes a flow inlet 224, a flow discharge 220, and a channel 222 extended therebetween. Cooling hole 215 has a central axis 226 that is oriented at an angle A1 relative to exterior surface 210 near discharge 220. In some embodiments, angle A1 is greater than or equal to about 30°. In some embodiments, axis 226 is oriented at approximately the same angle A1 relative to interior surface 212 near inlet 224. Moreover, in the exemplary embodiment, exterior surface 210 and interior surface 212 are substantially parallel to each other across a section S1 extending between flow inlet 224 and flow discharge 220.

During assembly, in the exemplary embodiment, a machining tool (not shown), such as a tool electrode in EDM, is positioned at an angle A1 in a desired location against surface 210. The machining tool is then extended through sidewall 201 to form cooling hole 215 and emerges from interior surface 212 to form flow inlet 224. When angle A1 is greater than 30°, the likelihood of the machining tool undesirably slipping across exterior surface 210 is reduced as compared to the likelihood of slippage occurring when forming channels oriented at smaller angles.

Figure 3A:
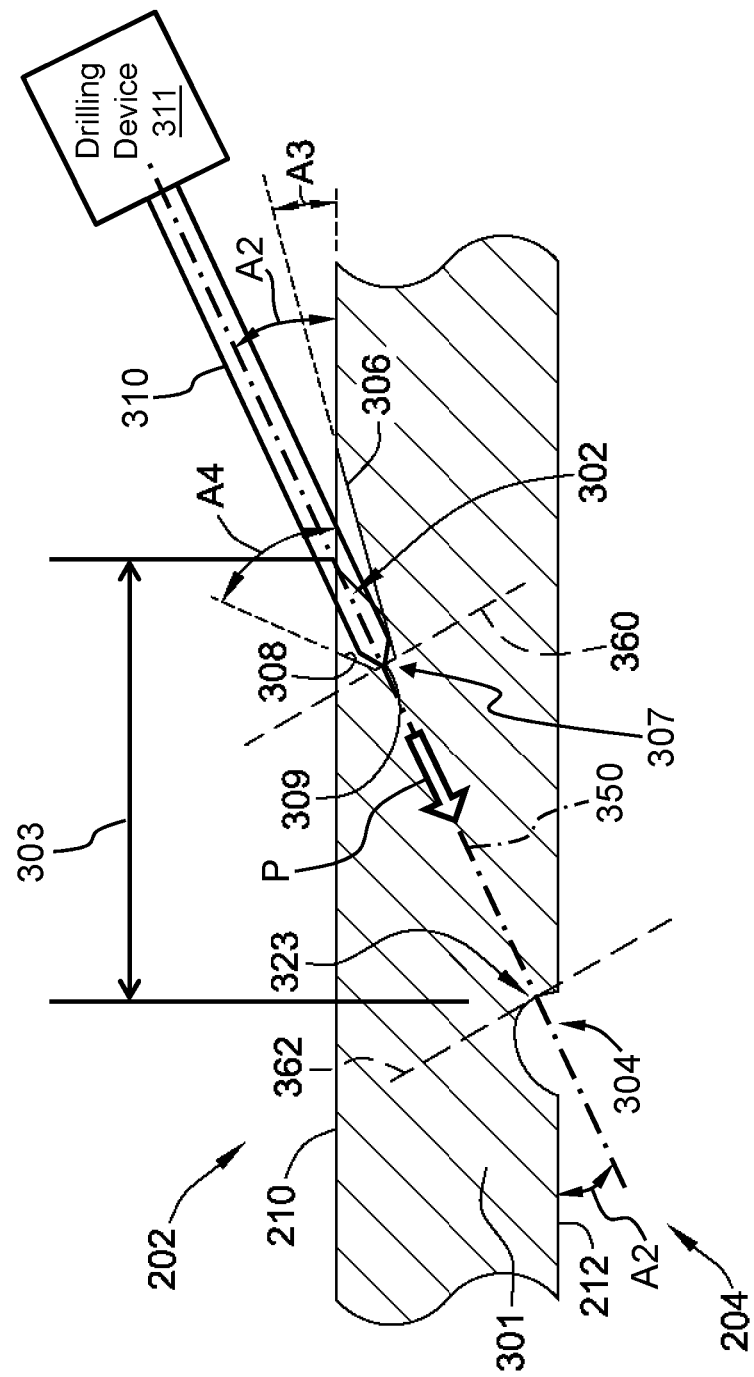
FIG. 3a is a vertical cross-section of an exemplary airfoil including a diffuser section created during a drilling process.

FIG. 3a is a cross-sectional view of an exemplary airfoil sidewall 301 including a diffuser section 302 created using the exemplary drilling process described herein. Components illustrated in FIG. 3a, identical to components illustrated in FIG. 2, are identified in FIG. 3a using the same reference numerals used in FIG. 2. Specifically, in the exemplary embodiment, diffuser section 302 is created in exterior surface 210 using EDM. In other embodiments, diffuser section 302 may be created using laser or water jet drilling processes. In the exemplary embodiment, diffuser section 302 is formed with a lower surface 306 that defines an angle A3 with respect to exterior surface 210. Diffuser section 302 is also formed with an upper surface 308 that defines an angle A4 with respect to exterior surface 210. In the example embodiment, angle A4 is larger than angle A3.

In the exemplary embodiment, upper surface 308 and lower surface 306 converge at an interior corner 307 of diffuser section 302 to define a drilling surface 309. During operation, a drilling element 310 of a drilling device 311 initiates drilling at drilling surface 309 to create a channel through airfoil sidewall 301, as is described in more detail below. Drilling surface 309 defines a flow discharge plane 360 where upper angle A4 and lower angle A3 are close to intersecting. In the exemplary embodiment, diffuser section 302 is generally conical in shape. Alternatively, diffuser section 302 may be any shape that enables drilling of cooling holes as described herein.

Further, in the exemplary embodiment, a flow inlet section 304 is provided. Flow inlet section 304 is generally semi-spherical in shape. Alternatively, flow inlet section 304 may be any shape that enables drilling of cooling holes as described herein. Flow inlet section 304 includes a drill-discharge surface 323 that, during operation, serves as one end of a channel (not shown in FIG. 3a) that is opposite diffuser section 302. Flow inlet section 304 may exist prior to forming diffuser section 302, or it may be created specifically in relation to and/or in anticipation of diffuser section 302. Flow inlet section 304, in the exemplary embodiment, defines a volume at the flow inlet end of cooling hole 315. Flow inlet section 304 defines a flow inlet plane 362 at drill-discharge surface 323. Flow inlet plane 362 and flow discharge plane 360 are approximately perpendicular to a central axis of a cooling channel (not shown in FIG. 3a) formed during drilling. In such embodiments, diffuser section 302 is formed at a location in external surface 210 such as to facilitate a particular orientation of a cooling hole, as described in greater detail below. Generally, the larger the horizontal distance 303 between flow inlet section 304 and diffuser section 302, as depicted in FIG. 3a, the smaller the angle of the cooling hole.

Figure 3B:
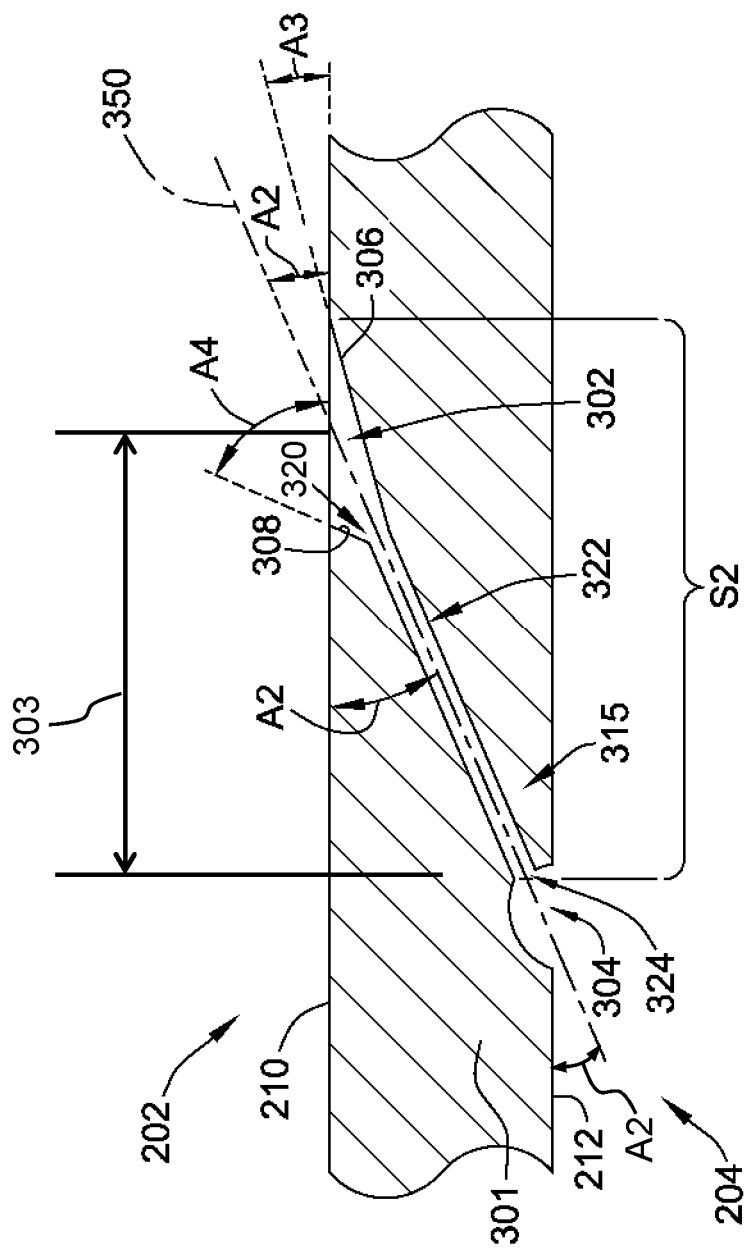

FIG. 3b is a cross-sectional view of an exemplary low-angle cooling hole 315 created using diffuser section 302 (shown in FIG. 3a). Components illustrated in FIG. 3b, identical to components shown in FIGS. 2 and 3a, are identified in FIG. 3b using the same reference numerals used in FIGS. 2 and 3a. In the exemplary embodiment, cooling hole 315 includes a flow inlet 324, a flow discharge 320, a channel 322 extending therebetween, and diffuser section 302. Further, in some embodiments, cooling hole 315 may also include flow inlet section 304.

Cooling hole 315 includes center axis 350 that is oriented at a first angle (A2) relative to exterior surface 210 near flow discharge 320. In some embodiments, angle A2 is less than 30°. In other embodiments, angle A2 is between about 5° and about 25°. In still other embodiments, angle A2 is between about 15° and about 25°. Further, in some embodiments, axis 350 is defined at approximately the same angle relative to interior surface 212 near flow inlet 324 as relative to exterior surface 210 near flow discharge 320. Moreover, in the exemplary embodiment, exterior surface 210 and interior surface 212 are substantially parallel to each other across a section S2 extending between approximately flow inlet 324 and flow discharge 320.

Diffuser section 302, in the example embodiment, defines a volume disposed at a flow discharge 320 end of cooling hole 315. Diffusers are known in the art for improving film cooling effectiveness of cooling holes. Diffusion reduces the discharge velocity and increases the static pressure of the airflow. Such diffuser sections 302 may expand flow from channel 322 in three axes, i.e., along the length of the hole, and in two in-plane perpendicular orthogonal axes. In the exemplary embodiment, diffuser section 302 generally defines a lower angle A3 and an upper angle A4 relative to exterior surface 210 similar to that shown in FIG. 3a. In some embodiments, lower angle A3 is less than axis angle A2. Further, in some embodiments, upper angle A4 is greater than axis angle A2. Moreover, in some embodiments, upper angle A4 may be up to 180°.

During assembly, in the exemplary embodiment, diffuser section 302 is formed or created prior to forming channel 322, as described above in reference to FIG. 3a. During the forming of diffuser section 302, a drilling surface 309 (shown in FIG. 3a) is formed at flow discharge 320. Surface 309 is approximately perpendicular to axis 350, i.e., represented by flow discharge plane 360 (shown in FIG. 3a). As used herein, the terms "stop surface" and "drilling surface" are used interchangeably to refer to the space within the diffuser section upon which the drilling element 310 rests at the beginning of the drilling process. Once stop surface 309 is formed, the working end of a machining tool (e.g., at least one of drilling element 310 and a tool electrode in EDM) is positioned on stop surface 309 and oriented at an approximately angle A2. The machining tool is then extended, during the drilling process, through the length of channel 322, along an approximate path P of axis 350, and emerging at approximately flow inlet 324 (as indicated by a path P arrow in FIG. 3A). When angle A2 is smaller than 30°, the problem of the machining tool slipping or skipping across exterior surface 210 is reduced by creating a stop surface with an angle that is receptive to enabling the machining tool to sit without skipping. In embodiments where flow discharge plane 360 is approximately perpendicular to axis 350, the working angle of the tool is at approximately a 90° angle relative to stop surface 309, i.e., the surface created at flow discharge plane 360.

In some embodiments, flow inlet section 304 is also formed prior to forming channel 322, as discussed above in reference to FIG. 3a. During the forming of flow inlet section 304, an exit surface (not separately shown) at flow inlet 324 is formed. The exit surface is approximately perpendicular to axis 350, i.e., as represented by flow inlet plane 362 (shown in FIG. 3a). Once the exit surface is formed, channel 322 is then formed. Having an exit surface at a greater angle, i.e., approximately 90°, relative to the direction of the workpiece, i.e., the "working angle", helps to avoid deformation of the exit surface that may occur when the exit surface is at a smaller angle relative to the working angle. In the exemplary embodiment, channel 322 is created starting at diffuser section 302. Alternatively, it may be possible to create cooling hole 315 by starting at flow inlet 324 in a similar fashion.

When airfoil sidewall 301 is in use, flow inlet 324, in the exemplary embodiment, is coupled in flow communication with a source of cooling fluid, such as the cooling fluid "F" and cooling circuit 40 (shown in FIG. 1). Cooling fluid passes through cooling hole 315 and exits channel 322 at flow discharge 320, where it is diffused by diffuser section 302, thereby cooling airfoil sidewall 301.

Figure 4:
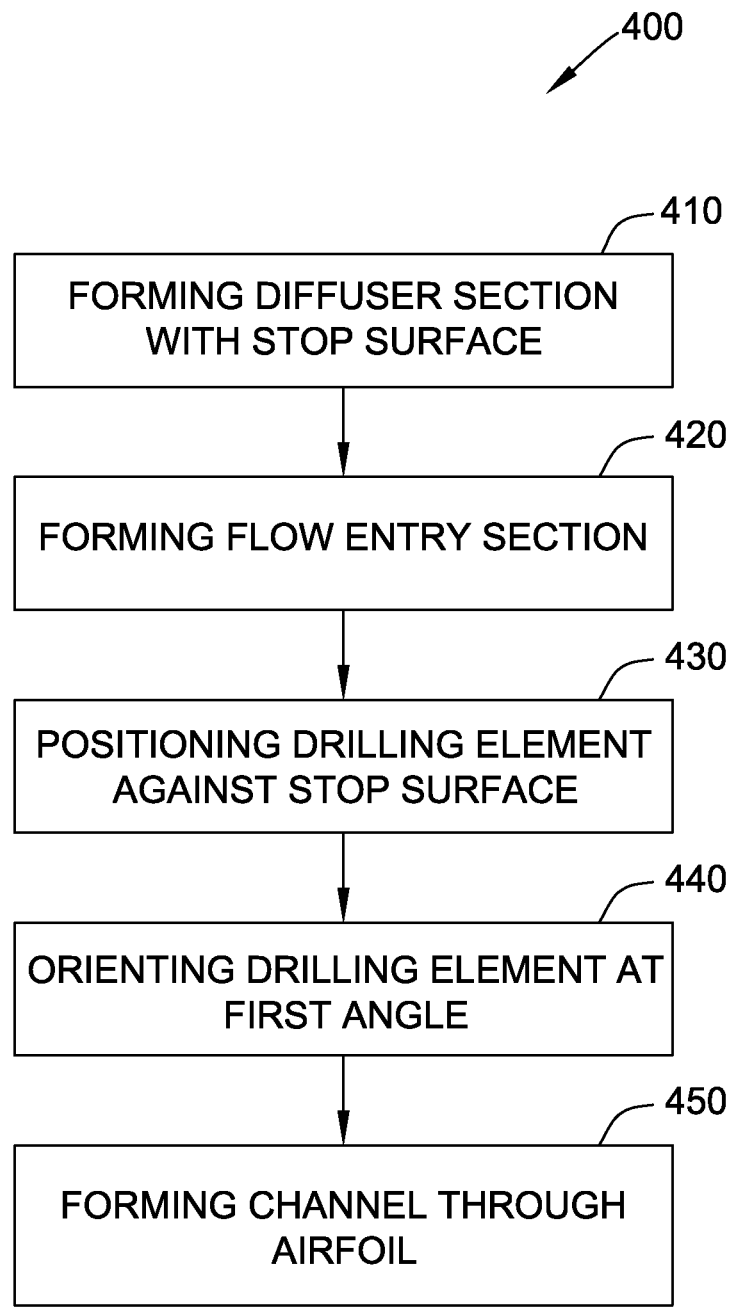
FIG. 4 is a flowchart of an exemplary method that may be used to create a film cooling hole in an airfoil.

FIG. 4 is a flowchart of an exemplary method 400 for creating a film cooling hole, such as cooling hole 315 (shown in FIG. 3), in an airfoil such as airfoil 22 (shown in FIG. 1). Method 400 includes forming 410 a diffuser section, such as diffuser section 302 (shown in FIG. 3b), in an exterior surface of an airfoil, such as surface 210 (shown in FIG. 3a). In the exemplary embodiment, forming 410 the diffuser section includes forming a stop surface, such as drilling surface 309. In some embodiments, a flow entry section, such as flow inlet section 304 (shown in FIGS. 3a and 3b), is also formed 420.

In the exemplary method 400, drilling element 310 is positioned 430 against stop surface 309. In some embodiments, drilling element 310 is an EDM tool and the working surface of the EDM process is stop surface 309. Drilling element 310 is oriented 440 at a first angle (e.g., angle A2) relative to the exterior surface of the airfoil, as described above. A channel, such as channel 322 (shown in FIG. 3b) is then formed 450 through the surface of the airfoil at approximately the first angle. In some embodiments, forming 420 the flow entry section on the inner surface of the airfoil is performed prior to forming 450 of the channel, such that forming 450 of the channel causes drilling element 310 (and channel) to exit within the flow entry section.

The above-described systems and methods provide a way to drill shallow-angle flow channels in airfoils in an effective and reliable manner. The embodiments described herein eliminate skipping problems that occur when using conventional drilling methods. By creating a diffuser section in the exterior surface prior to drilling, a stop surface can be created in an interior corner, upon which the working element of drilling device can rest without slippage. The stop surface allows the working element to rest at a greater angle than otherwise would be possible. As such, risk of slipping is reduced or eliminated.

An exemplary technical effect of the methods described herein includes at least one of: (a) reducing the risk of slippage of a working element of a drilling device; (b) enabling the drilling of a cooling hole at smaller angles than possible with at least some known drilling methods; (c) reducing surface damage and material property degradation at the drilling exit point.

Exemplary embodiments of methods for drilling low-angle holes in airfoils are described above in detail. The methods described herein are not limited to the specific embodiments described herein, but rather, components of systems and/or steps of the methods may be utilized independently and separately from other components and/or steps described herein. For example, the methods may also be used in combination with other systems requiring low-angle hole drilling methods, and are not limited to practice with only the drilling methods as described herein. Rather, the exemplary embodiments can be implemented and utilized in connection with many other drilling applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fabricating an airfoil, said method comprising:
    forming a diffuser section in an exterior surface of the airfoil, wherein the diffuser section is defined by at least an outer surface and an inner surface that converge at a stop surface;
    forming a flow inlet section in an interior surface of the airfoil opposite to the exterior surface, the flow inlet section being offset a horizontal distance from the diffuser section and oriented at a first angle relative to the exterior surface;
    positioning a drilling element of a drilling device on the stop surface;
    orienting the drilling element at the first angle relative to the exterior surface; and
    forming, using the drilling element, a channel extending through the airfoil from the stop surface to a drill discharge surface of the flow inlet section at an interior end of the channel proximate the flow inlet section in the interior surface, thereby forming the channel at substantially the first angle.

2. The method of claim 1, wherein said positioning the drilling element comprises positioning the drilling element such that the stop surface facilitates maintaining a position of the drilling element at the stop surface during said forming of the channel.

3. The method of claim 1, wherein said forming the diffuser section comprises forming the diffuser section with the outer surface having a second angle, relative to the exterior surface, that is larger than the first angle and that is less than about 90°.

4. The method of claim 1, wherein said forming the diffuser section comprises forming the diffuser section with the inner surface having a third angle, relative to the exterior surface, that is less than the first angle.

5. The method of claim 1, wherein said orienting the drilling element comprises orienting the drilling element at the first angle of between about 5° and about 25° relative to the exterior surface.

6. The method of claim 5, wherein said orienting the drilling element comprises orienting the drilling element at the first angle of between about 10° and about 15° relative to the exterior surface.

7. The method of claim 1, wherein said forming the diffuser section comprises forming the diffuser section including the stop surface that is substantially perpendicular to the first angle.

8. The method of claim 1, wherein said forming the channel comprises forming the channel using one of electric discharge machining and a water jet process.

9. A method for fabricating an airfoil, said method comprising:
    forming a diffuser section in an exterior surface of the airfoil, wherein the diffuser section is defined by at least an outer surface and an inner surface that converge at a stop surface;
    forming a flow inlet section in an interior surface of the airfoil opposite the exterior surface, the flow inlet section being offset a horizontal distance from the diffuser section and oriented at a first angle relative to the exterior surface;
    positioning a drilling element of a drilling device on the stop surface;
    orienting the drilling element at the first angle relative to the exterior surface; and
    forming, using the drilling element and after said forming the flow inlet section, a channel extending through the airfoil from the stop surface to the flow inlet section.

10. The method of claim 9, wherein said forming the diffuser section comprises forming the diffuser section with the outer surface having a second angle, relative to the exterior surface, that is larger than the first angle and that is less than about 90°.

11. The method of claim 9, wherein said forming the diffuser section comprises forming the diffuser section with the inner surface having a third angle, relative to the exterior surface, that is less than the first angle.

12. The method of claim 9, wherein said orienting the drilling element comprises orienting the drilling element at the first angle of between about 5° and about 25° relative to the exterior surface.

13. The method of claim 12, wherein said orienting the drilling element comprises orienting the drilling element at the first angle of between about 10° and about 15° relative to the exterior surface.

14. The method of claim 9, wherein said forming the diffuser section comprises forming the diffuser section including the stop surface that is substantially perpendicular to said first angle.

15. An airfoil comprising:
    a diffuser section formed in an exterior surface of the airfoil, wherein the diffuser section is defined by at least an upper surface and a lower surface, wherein the upper and lower surfaces extend from the exterior surface to a flow discharge plane, and wherein the upper and lower surfaces converge towards the flow discharge plane;
    a flow inlet section formed in an interior surface of the airfoil opposite the exterior surface, the flow inlet section being offset a horizontal distance from the diffuser section and defining a curved surface; and
    a channel extending through the airfoil along a channel axis and coupled in flow communication between the flow inlet section and the diffuser section, wherein the channel axis is oriented at an oblique first angle with respect to the exterior surface and the interior surface and is approximately perpendicular to the flow discharge plane, wherein the channel intersects the diffuser section at the flow discharge plane and intersects the curved surface at a flow inlet plane, and wherein the flow inlet plane is spaced from the flow discharge place along the channel axis and is approximately perpendicular to the channel axis.

16. The airfoil of claim 15, wherein the channel is oriented at substantially the first angle, relative to the exterior surface, that is less than 30°.

17. The airfoil of claim 15, wherein the channel is oriented at substantially the first angle of between about 5° and about 25° relative to the exterior surface.

18. The airfoil of claim 15, wherein the channel is oriented at substantially the first angle of between about 10° and about 15° relative to the exterior surface.

\* \* \* \* \*